United States Patent [19]
Franz et al.

[11] Patent Number: 5,695,876
[45] Date of Patent: Dec. 9, 1997

[54] METHOD AND COMPOSITION FOR APPLYING ACIDIC INTERLEAVING MATERIAL IN AQUEOUS MEDIA TO GLASS SHEETS

[75] Inventors: Helmut Franz, Pittsburgh; Fred A. Fortunato, Allison Park, both of Pa.

[73] Assignee: PPG Industries, Inc., Pittsburgh, Pa.

[21] Appl. No.: 528,830

[22] Filed: Sep. 15, 1995

[51] Int. Cl.⁶ .................................................. B32B 5/16
[52] U.S. Cl. .................. 428/326; 65/24; 25/11; 25/142; 25/DIG. 7; 427/384; 427/420; 428/438
[58] Field of Search .................. 106/2, 13; 65/24; 252/70, 11, 142, DIG. 1, DIG. 10; 427/384, 420; 428/326, 432, 438

[56] References Cited

U.S. PATENT DOCUMENTS

| | | | |
|---|---|---|---|
| 3,897,348 | 7/1975 | Atkinson | 252/DIG. 7 |
| 4,487,807 | 12/1984 | Duffer et al. | 428/422 |
| 4,489,106 | 12/1984 | Duffer et al. | 427/154 |
| 4,529,648 | 7/1985 | Duffer et al. | 428/326 |
| 4,530,889 | 7/1985 | Duffer et al. | 428/326 |
| 4,568,605 | 2/1986 | Duffer et al. | 428/326 |
| 4,587,030 | 5/1986 | Casey | 252/DIG. 10 |
| 4,606,946 | 8/1986 | Duffer et al. | 427/384 |
| 5,379,904 | 1/1995 | Brown | 211/41 |

*Primary Examiner*—Michael Lusignan
*Attorney, Agent, or Firm*—Raymond J. Harmuth

[57] ABSTRACT

A method and composition are disclosed for applying an organic acid-containing aqueous composition to a glass surface to prevent staining thereof wherein a wetting agent is employed to provide uniform and complete wetting of the glass surface with a uniform continuous film of said organic acid-containing aqueous composition.

25 Claims, 1 Drawing Sheet

5,695,876

METHOD AND COMPOSITION FOR APPLYING ACIDIC INTERLEAVING MATERIAL IN AQUEOUS MEDIA TO GLASS SHEETS

FIELD OF THE INVENTION

This invention relates generally to the art of interleaving materials used to separate glass sheets when they are stacked for transportation or storage, and more particularly to interleaving materials containing acid, such as adipic and/or malic acid in, aqueous media.

BACKGROUND

It is well known that water can react with soda-lime-silica glass, very slowly, leaching sodium ions from the glass and forming sodium hydroxide, which raises the pH of the water in contact with the glass surface as follows:

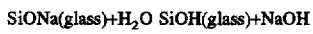

If a small volume of water is left in contact with a glass surface for a prolonged period, as can occur in a stack of glass sheets in transit or storage, the pH can become highly alkaline. At pH levels above about 9.0, the hydroxide ions can cause corrosion of the glass surface by destroying silicon-oxygen bonds as follows:

literally dissolving the glass which results in a hazy or iridescent corroded glass surface. Since transportation and storage conditions cannot always be controlled, it has been common practice for glass manufacturers to use a variety of paper or powder interleaving materials between the surfaces of stacked glass sheets to retard stain damage. Such interleaving materials provide physical separation of the glass sheet surfaces, to minimize mechanical damage, such as abrasion, and also may comprise acid compounds to neutralize the hydroxide formed from alkali ions reacting with water, and retard the pH increase which leads to staining of the glass surface. A common interleaving material comprises polymethylmethacrylate beads for physical separation and adipic acid for neutralizing the hydroxide. Glass sheets may be stacked for transportation and/or storage in a variety of pack, box, pallet or rack configurations. A preferred shipping rack is described in U.S. Pat. No. 5,379,904, the disclosure of which is incorporated herein by reference.

U.S. Pat. No. 4,487,807 to Duffer et al. discloses protecting glass surfaces in a stack of glass sheets by treating the surfaces with a mixture of stain-inhibiting organic acids which crystallize on the glass surface, and separating adjacent glass sheets with an interleaving material, preferably in particulate form, such as synthetic polymeric beads or natural porous cellulose materials such as wood flour.

U.S. Pat. No. 4,489,106 to Duffer et al. discloses a two-step method for protecting glass surfaces in a stack of glass sheets by first treating the glass surfaces with a solution of stain-inhibiting organic hydroxy acid and drying the surface prior to dispersing a finely divided particulate interleaving material on the glass surface.

U.S. Pat. No. 4,529,648 to Duffer et al. discloses a method for applying a powdered interleaving material to a glass surface in the form of an aqueous slurry. The powdered interleaving material is preferably a porous cellulose material, such as wood flour or rice flour, which may also comprise a stain-inhibiting acid material such as boric acid, citric acid or tartaric acid.

U.S. Pat. No. 4,606,946 to Duffer et al. discloses a method for applying a powdered interleaving material to a glass surface in the form of an aqueous composition comprising particulate interleaving material dispersed in atomized water. The interleaving material is dispersed into atomized water which is then dispersed above the glass surface. The aqueous interleaving composition then settles by gravity onto the glass to dry. A uniform adherent layer of interleaving material forms on the glass surface.

The above stain prevention techniques share significant disadvantages. Poor wetting of the organic acid solution on the glass surface at typical applications temperatures of 130° to 150° F. prevents application in liquid form. High pressure and volumes of atomizing air are used to apply the organic acid solution as a "fog" which dries enroute to the glass surface. Much of the acid solution is lost as overspray, settling on equipment and other surfaces, or being removed through exhaust means. Such application methods are generally inefficient, depositing only about 10 percent of the acid on the glass surface. The material deposited on the surface may not be uniformly dispersed. While such uneven coverage may still produce adequate stain prevention, the formation of clusters of acid deposits may interfere with other processing, such as inspection and cutting.

SUMMARY OF THE INVENTION

The present invention provides stain-inhibiting protection to glass surfaces in stacked glass sheets utilizing conventional liquid application methods without encountering the prior art problems of nonwetting, agglomeration, overspray and simple waste of material which does not remain on the glass surface. Organic stain-inhibiting material soluble in water may be applied in solution form. Less soluble organic acid stain inhibiting material may be applied in the form of an aqueous slurry. Preferred stain-inhibiting materials are organic acids in buffered form as disclosed in copending application U.S. Ser. No. 08/528,833, filed on even date herewith, entitled "Buffered Acid Interleaving For Glass Sheets". With the addition of a suitable surfactant, the aqueous acidic media may be applied by conventional liquid application techniques such as drip, flow, roll coating, conventional spray, reciprocating spray, rotary spray, or curtain spray, maximizing the amount of aqueous acidic media deposited on the glass and minimizing overspray. A preferred method is a linear curtain spray as described in U.S. Pat. No. 4,072,772, the disclosure of which is incorporated herein by reference.

DESCRIPTION OF PREFERRED EMBODIMENTS

Figure 1:
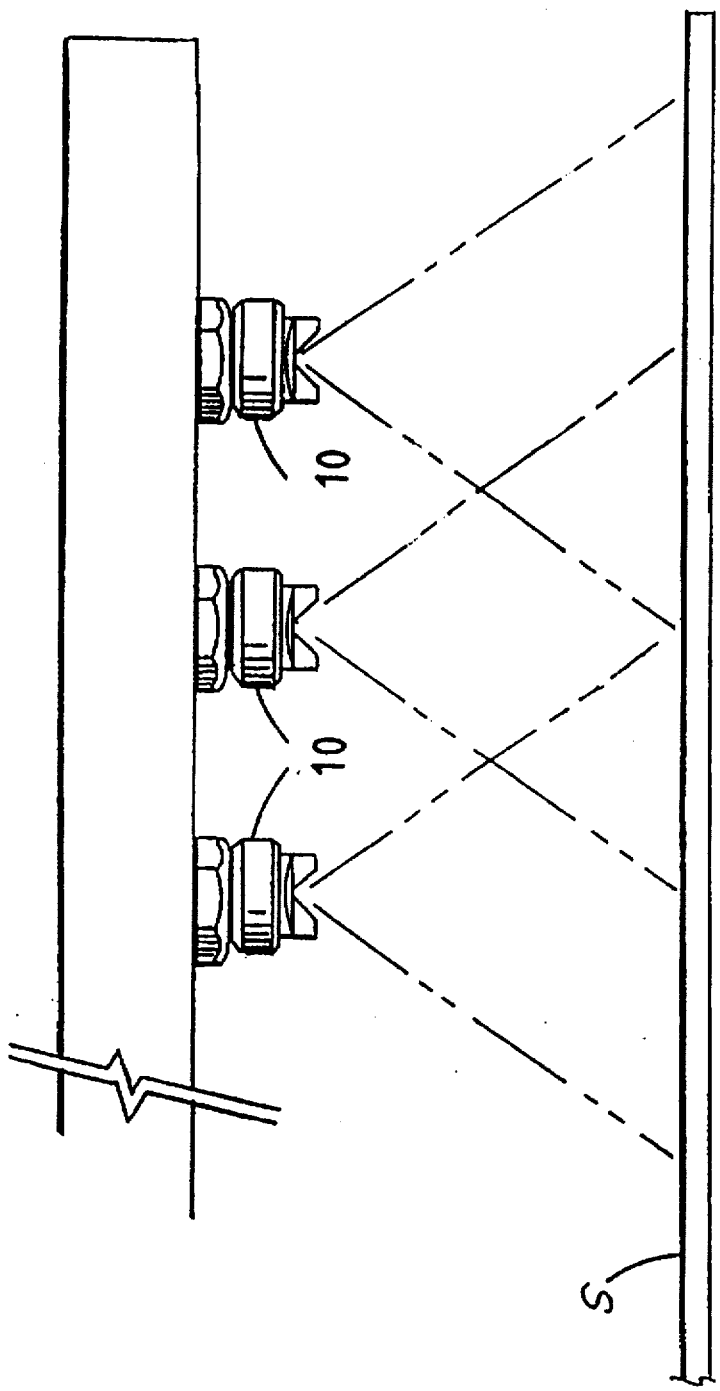
FIG. 1 illustrates a linear curtain spray comprising nozzles 10 transversely disposed above the surface (S) of a moving float glass ribbon 20.

Glass, preferably in the Form of a continuous ribbon, but in discrete sheet form as well, is treated with an aqueous medium, comprising an organic acid to reduce stain, in the form of a solution or suspension containing a wetting agent that allows the glass surface to be contacted with a continuous liquid film which completely wets the glass surface. Without the wetting agent of the present invention the carboxyl groups of the acid adhere to the glass surface, and the hydrocarbon portion of the organic acid forms an autophobic surface which causes the solution to bead up rather than form a uniform film. Using a wetting agent in accordance with the present invention, the acidic solution completely wets the glass surface in a uniform continuous film, insuring uniform complete coverage. Thus, conventional liquid application techniques and apparatus, such as spray gun, linear curtain spray, drip and flow coating may be used in accordance with the present invention, instead of the inefficient atomized spray methods of the prior art.

Direct liquid application of the aqueous compositions of organic acid, preferably buffered, and wetting agent of the present invention is preferably by curtain spray method. Curtain spray utilizes lower air flow and lower pressure, typically 1 to 15 pounds per square inch (psi), thereby minimizing turbulence and overspray characteristic of atomizing air pressures of about 40 psi for fog spray application methods. One advantage of a direct liquid application method such as curtain spray is a small space requirement for operation of a linear curtain spray, compared with a large spray booth requirement for the atomized fog-type spray. Another advantage of a direct liquid application method is minimal exhaust capacity requirement; an open canopy hood is sufficient, compared with large volume exhaust means to service a large spray booth. A further advantage, since essentially all of the acidic composition is deposited on the glass, is no acid irritation to personnel. A major advantage, of course, is substantially less waste of material, and thus great savings in material costs. Direct liquid application in accordance with the method of the present invention is expected to transfer at least 70 percent and optimally at least 90 percent of the material to the glass surface, compared with only 8 to 10 percent in the atomized fog method of the prior art. Also, eliminating substantial overspray means less down time and costs in cleaning space and equipment, and repair and maintenance of equipment.

With a preferred composition of 4.0 weight percent adipic acid, 1.76 weight percent ammonium hydroxide (31.5 percent aqueous solution) and 0.05 weight percent surfactant (MAZAWET-77, a product of PPG Industries) and a delivery rate of 0.5 cc of solution per square foot of glass, an estimate of efficiency of application is about 75 percent. Other preferred compositions are obtained by mixing adipic acid and diammonium adipate in equimolar proportions.

Substantially all of the aqueous medium is applied to the glass surface in accordance with the present invention, eliminating waste in the form of overspray and atomized liquid withdrawn through exhaust means. The aqueous medium may be a suspension, but is preferably a solution of an organic acid used to prevent staining of the glass surface from alkali formed from sodium which diffuses from the glass surface. Suitable organic acids of the general formula RCOOH wherein R is an organic radical, and there may be more than one carboxylic acid group, are well-known in the art and include carboxylic acids, dicarboxylic acid, tricarboxylic acids, tetracarboxylic acids and hydroxydicarboxylic acids, such as adipic, citric, malic, maleic, succinic, tartaric, ethylenediaminetetraacetic (EDTA) acid and mixtures thereof. Such acids are typically used in low concentration, based upon their solubility in water.

A preferred stain-inhibiting acid in accordance with the present invention is adipic acid. Adipic acid is soluble in water at low levels, for example about 1.4 percent by weight at 60° F., 1.2 percent at 50° F. and 1.0 percent at 40° F. to yield an aqueous acid solution with a pH of less than 3. In a preferred embodiment of the present invention, adipic acid is used in buffered form by reacting the adipic acid with ammonium hydroxide to yield ammonium adipate. By reacting adipic acid with up to an equimolar amount of ammonium hydroxide, primarily monoammonium adipate is formed. Monoammonium adipate is readily soluble in water at concentrations of up to 10 percent by weight at ambient temperatures. The pH of an aqueous solution of monoammonium adipate is about 5, and so is far less corrosive than solutions of adipic acid. Solutions of monoammonium adipate show no significant loss of stain-inhibiting capacity compared with adipic acid solutions at the same concentrations. Reacting adipic acid with more than an equimolar amount of ammonium hydroxide, up to a 1:2 ratio, produces a mixture of monoammonium and diammonium adipate. Such a mixture is also readily soluble in water to produce a solution with a pH approaching neutral, and similar stain-inhibiting performance as solutions of monoammonium adipate.

The preferred solutions of buffered acid comprise 1 to 10 percent, preferably about 4 percent by weight, of ammonium adipate in water to yield a pH above 3, preferably near 5, up to a neutral pH of 7. The buffered acid solution is preferably applied at a rate so that the amount of buffered acid is sufficient to neutralize the quantity of alkali expected to be formed. For ammonium adipate applied to typical soda-lime-silica float glass compositions, a coverage rate of 5 to 40, preferably 10 to 20, most preferably about 15, milligrams per square foot is preferred.

The higher solubility of buffered acid, e.g. ammonium adipate, allows application of sufficient neutralizing capacity in a single step, i.e. without additional acid in powder or particle form, and prevents precipitation of acid at lower temperatures, which reduces clogging of equipment and the need to heat the solution.

The higher pH of buffered acid solution, e.g. pH of about 5 for ammonium adipate, causes less corrosion of equipment than an organic acid solution, e.g. adipic acid at a pH of about 2.75. The neutralizing range of about 5 to 9 pH for buffered acid material is more neutral than the neutralizing pH range of about 3 to 7 typical of acids such as adipic acid, while still neutralizing the same quantity of alkali, equivalent per equivalent, e.g. two moles of sodium hydroxide per mole of either adipic acid, monoammonium adipate, diammonium adipate or mixtures thereof in any ratio to yield a desired pH.

The addition of a wetting agent allows the acidic aqueous composition to completely wet the glass surface to provide uniform coverage with a direct liquid application method such as a linear curtain spray, without the overspray waste of an atomized or fog-type application method.

In order to apply the buffered acid solution to the glass surface by conventional liquid application techniques, such as a linear curtain spray, a suitable surfactant is added. The surfactant is preferably a nonionic, anionic or amphoteric surfactant with low foaming properties, a high cloud point and efficient rinsing. Preferred surfactants include polyalkoxyalkyl ethers, polyalkoxyaryl ethers and mixtures thereof, preferably alkylaryl polyethoxybenzyl ethers, alkyl polyethoxymethyl ethers and mixtures thereof. The concentration of surfactant is preferably in the range of 0.01 to 0.10 percent by weight of the buffered acid solution. For optimal wetting, coverage and appearance of the glass surface, a concentration of 0.02 to 0.05 is preferred.

The present invention will be further understood from the descriptions of specific examples which follow.

EXAMPLES

The top surface of a float glass ribbon 3.3 millimeters thick was sprayed with a solution comprising 4.00 percent by weight adipic acid, 1.76 percent by weight ammonium hydroxide, and 0.05 percent octylphenyl polyethoxybenzyl ether wetting agent (MAZAWET-77, a product of PPG). The solution had a concentration of about 48 milligrams per cubic centimeter (mg/cc) of adipic acid, mostly in the form of ammonium adipate. The buffered acid solution was applied to the glass surface at application rates of 0.2, 0.3 and 0.5 cubic centimeters per square foot of glass surface. The buffered acid solution was then diluted to a concentration of about 21 milligrams per cubic centimeter (mg/cc) of adipic acid equivalent, i.e. mostly the buffered species ammonium adipate, and applied at application rates of 0.2, 0.6 and 1.0 cubic centimeters per square foot of glass. The various combinations of solution concentration and application rate resulted in coverage rates of from 4.6 to 23.7, calculated as milligrams of acid equivalent per square foot of glass. The amount of buffered adipic acid actually deposited on the glass surface was measured by washing treated glass samples of known surface area with ultrapure water, and analyzing the wash water by ion chromatography to quantify the amount of adipic acid equivalent. The actual coverage rates, as measured by ion chromatography of washed off material, ranged from 3.0 to 17.0 milligrams per square foot, yielding spray efficiencies of 58 to 82 percent, as shown in the following Table I. Treated glass samples were stacked in parallel facing relationship, separated by LUCITE beads, and exposed to 140° F., 100 percent relative humidity to evaluate the development of stain on the treated glass surfaces. With buffered acid coverage of less than about 9 mg/ft$^2$, some very light stain was observed on the treated glass surface after 45 days of exposure. At higher rates of buffered acid coverage, no stain was observed on the treated glass surface as shown in the following Table II, which also shows that untreated glass exhibits very heavy stain after only 14 days of exposure in the same environment.

TABLE I

| Solution Concentration (mg/cc) | Spray Rate (cc/ft$^2$) | Coverage Rate (mg/ft$^2$) | | Efficiency (%) |
|---|---|---|---|---|
| | | Calculated | Measured | |
| 21 | 0.2 | 4.6 | 3.0 | 65 |
| 21 | 0.6 | 12.0 | 8.8 | 73 |
| 21 | 0.6 | 12.0 | 9.0 | 75 |
| 21 | 1.0 | 20.8 | 17.0 | 82 |
| 48 | 0.2 | 7.4 | 4.1 | 55 |
| 48 | 0.3 | 16.3 | 9.1 | 56 |
| 48 | 0.5 | 23.7 | 13.7 | 58 |
| 0 | 0 | 0 | 0 | — |

TABLE II

| Coverage Rate (mg/ft$^2$-measured) | Exposure (days) | Glass Surface (appearance) |
|---|---|---|
| 0 | 14 | very heavy stain |
| 3.0 | 14 | no stain |
| | 30 | very light stain |
| | 45 | light to medium stain |
| 4.1 | 30 | spotty medium to heavy stain |
| | 45 | spotty medium to heavy stain |
| 8.8 | 14 | no stain |
| | 30 | no stain |
| | 45 | very light stain |
| 9.0 | 30 | no stain |
| | 45 | very light stain |
| 9.1 | 14 | no stain |
| | 30 | no stain |
| | 45 | none to very light stain |

TABLE II-continued

| Coverage Rate (mg/ft$^2$-measured) | Exposure (days) | Glass Surface (appearance) |
|---|---|---|
| 13.7 | 14 | no stain |
| | 30 | no stain |
| | 45 | no stain |
| 17.0 | 30 | no stain |
| | 45 | no stain |

The above examples are offered to illustrate the present invention. Various liquid application techniques, application rates, wetting agents and concentrations may be employed. Any liquid application method capable of applying a uniform film is suitable. The liquid application rate must be sufficient to apply an adequate quantity of stain-inhibiting material to the glass surface while allowing the solution to dry before the glass surface is subjected to further processing, such as cutting. Any suitable wetting agent may be used, providing that a uniform completely wetting film is formed on the glass surface. The concentration of stain-inhibiting material is limited primarily by its solubility if used in solution, and is preferably sufficient to allow adequate coverage of the glass surface without applying more solution than can be readily dried in the time and space available. The temperature of the glass at the point where the solution is applied will affect how quickly it dries, and auxiliary heating may be applied to promote faster drying if desired. The scope of the invention is defined by the following claims.

What is claimed is:

1. A method of providing an interleaving material layer on a surface of a glass sheet comprising the steps of:

providing an interleaving composition comprising an aqueous medium, an organic acid having the general formula RCOOH, wherein R is an organic radical and the organic acid may include more than one carboxylic acid group, and a wetting agent selected from the group consisting of polyalkoxyethers, polyalkoxyaryl ethers and mixtures thereof;

contacting the surface of the glass sheet with the interleaving composition wherein the wetting agent assists in the forming of a uniform continuous liquid film of the interleaving composition on the glass surface; and drying the liquid film on the surface of the glass sheet to provide the interleaving material layer on the surface of the glass sheet.

2. The method of claim 1 wherein the organic acid is selected from the group consisting of carboxylic acids, dicarboxylic acids, hydroxydicarboxylic acids, tricarboxylic acids, tetracarboxylic acids and mixtures thereof.

3. The method of claim 2 wherein the organic acid is selected from the group consisting of adipic acid, citric acid, malic acid, maleic acid, succinic acid, tartaric acid, ethylenediaminetetraacetic acid and mixtures thereof.

4. The method of claim 1 wherein the wetting agent is selected from the group consisting of octylphenyl polyethoxybenzyl ether, alkyl polyethoxymethyl ether and mixtures thereof.

5. The method of claim 1 wherein the organic acid is a buffered organic acid.

6. The method of claim 5 wherein the buffered organic acid is provided by reacting the organic acid with ammonium hydroxide, defined as a buffering step.

7. The method of claim 6 wherein the organic acid is adipic acid and said buffering step includes reacting the adipic acid with the ammonium hydroxide and water to form an aqueous solution of one or more ammonium adipate compounds selected from the group consisting of monoammonium adipate, diammonium adipate and mixtures thereof, said aqueous solution having a pH of about 3 to 7.

8. The method of claim 7 wherein said ammonium adipate compound is monoammonium adipate.

9. The method of claim 8 wherein the aqueous solution of the monoammonium adipate has a pH of about 5.

10. The method of claim 7 wherein said ammonium adipate compound is a mixture of monoammonium adipate and diammonium adipate.

11. The method of claim 10 wherein the aqueous solution of the mixture of monoammonium adipate and diammonium adipate has a pH of about 7.

12. The method of claim 7 wherein the interleaving composition includes about 0.05 weight percent wetting agent and about 4.0 weight percent adipic acid reacted with about 1.76 weight percent ammonium hydroxide.

13. The method of claim 7 wherein the interleaving composition comprises about 1 to 10 percent by weight ammonium adipate and about 0.01 to 0.1 percent by weight wetting agent in water.

14. The method of claim 13 wherein the interleaving composition comprises about 0.02 to 0.05 percent by weight wetting agent.

15. The method of claim 13 wherein the glass sheet is a soda-lime-silica float glass ribbon and the contacting step includes applying the interleaving composition to the soda-lime-silica float glass ribbon at a coverage rate of about 5 to 40 milligrams per square foot of glass ribbon.

16. The method of claim 1 wherein said contacting step includes applying the interleaving composition to the surface of the glass sheet by a curtain spray method.

17. A glass sheet having a stain inhibiting surface, the stain inhibiting surface comprising:

an interleaving material layer disposed over a surface of said glass sheet, said interleaving material layer including an organic acid having the general formula RCOOH, wherein R is an organic radical and the organic acid may include more than one carboxylic acid group, and a wetting agent selected from the group consisting of polyalkoxyethers, polyalkoxyaryl ethers and mixtures thereof, wherein the interleaving material layer inhibits staining of said surface of said glass sheet.

18. The glass sheet of claim 17 wherein said organic acid is selected from the group consisting of carboxylic acids, dicarboxylic acids, hydroxydicarboxylic acids, tricarboxylic acids, tetracarboxylic acids and mixtures thereof.

19. The glass sheet of claim 18 wherein said organic acid is selected from the group consisting of adipic acid, citric acid, malic acid, maleic acid, succinic acid, tartaric acid, ethylenediaminetetraacetic acid and mixtures thereof.

20. The glass sheet of claim 17 wherein said wetting agent is selected from the group consisting of polyethoxybenzyl ethers, polyethoxymethyl ethers and mixtures thereof.

21. The glass sheet of claim 17 wherein said organic acid is in buffered form.

22. The glass sheet of claim 21 wherein said buffered organic acid is an ammonium adipate compound selected from the group consisting of monoammonium adipate, diammonium adipate and mixtures thereof.

23. An interleaving composition for forming an interleaving material layer on a surface of a glass sheet consisting essentially of:

an aqueous medium;

an organic acid having the general formula RCOOH, wherein R is an organic radical and the organic acid has one or more carboxylic acid groups; and a wetting agent selected from the group consisting of polyalkoxyethers, polyalkoxyaryl ethers and mixtures thereof.

24. The interleaving composition of claim 23 wherein said organic acid is in buffered form.

25. The interleaving composition of claim 24 wherein said buffered organic acid is an ammonium adipate compound selected from the group consisting of monoammonium adipate, diammonium adipate and mixtures thereof and said wetting agent is selected from the group consisting of octylphenyl polyethoxybenzyl ether, alkyl polyethoxymethyl ether and mixtures thereof.

* * * * *